3,720,360

METHOD AND APPARATUS FOR CORRECTING THE ZIGZAG MOVEMENT OF A FLEXIBLE STRIP

Sigeru Tezuka, Shinichi Tanaka, and Seiichi Taguchi, Asaka, Japan, assignors to Fuji Photo Film Co., Ltd., Kanagawa, Japan Filed Nov. 29, 1971, Ser. No. 202,922
Claims priority, application Japan, Dec. 28, 1970, 46/120,324
Int. Cl. B65h *23/02*
U.S. Cl. 226—3 4 Claims

ABSTRACT OF THE DISCLOSURE

A method of correcting the zigzag movement of a flexible strip as it is being transported in a longitudinal direction, which comprises the steps of forming a loop at the flexible strip supply side of the zigzag moving portion of the strip when the zigzag movement of the strip takes place while the strip is transported, tentatively stopping the transportation of the flexible strip before entering the loop, extending one side of the end of the strip in zigzag direction, and thereafter feeding the zigzag portion of the strip so as to correct the zigzag movement of the flexible strip at the zigzag moving portion while moving the zigzag moving portion of the strip. This method is performed by apparatus for correcting the zigzag movement of a flexible strip, which has a detecting portion for detecting the displacement of the position of the strip during transportation of the flexible strip, a control portion for selecting either the plus or minus of the detected signal upon receipt, and a strip extending portion for stopping the transportation of the strip for a predetermined section after forming a loop of the flexible strip at the entering side of the portion displaced at the position by the order of the control portion and for extending one side of the end of the stopped portion of the flexible strip, thereby correcting the zigzag movement of the flexible strip at the zigzag moving portion while transporting the flexible strip in a longitudinal direction at the portion displaced at the position.

BACKGROUND OF THE INVENTION

This invention relates to a method and apparatus for automatically correcting the zigzag movement of a flexible strip such as, for example, dye transfer paper, during a transporting step of a flexible strip in a device for treating a flexible strip such as, for example, the continuous dye transfer step to a long roll of paper in a rotary dye transfer device.

There exist various types of methods and apparatus that have been used heretofore for correcting the zigzag movement of strip such as, a dancer roller type (FIG. 1), two roll type (FIG. 2) and four roll type (FIG. 3), but all have the phenomena that tension on one side of the paper is propagated through the paper, and is brought into the rotary dye transfer device. As a result, irregular deflection of the paper takes place in the rotary dye transfer device to cause various inconveniences. For example, images of three colors are displaced or the errors in registering take place in the rotary dye transfer device. That is, in the conventional method and apparatus, the tentative strain given to the flexible strip is fed into the rotary dye transfer device together with a permanent strain so that such unstable tentative strain tends to be eliminated in the rotary dye transfer device with the result that a large registration error takes place.

SUMMARY OF THE INVENTION

It is, therefore, an object of this invention to provide a method of correcting the zigzag movement of a flexible strip which can automatically and accurately correct the zigzag movement of the strip so as to completely remove the error in the registration of multi-color dye transfer, thereby to enhance the operating efficiency and to raise the quality of product.

It is another object of this invention to provide an apparatus for performing the above method.

According to one aspect of this invention, there is provided a method of correcting the zigzag movement of a flexible strip, which comprises the steps of forming a loop at the flexible strip supply side of the zigzag moving portion of the strip when the zigzag movement of the strip takes place while the strip is transported, tentatively stopping the transportation of the flexible strip before entering the loop, extending one side of the end of the strip in the zigzag direction, and thereafter feeding the zigzag portion of the strip so as to correct the zigzag movement of the flexible strip at the zigzag moving portion while moving the zigzag moving portion of the strip.

According to another aspect of this invention, there is provided an apparatus for correcting the zigzag movement of a flexible strip which comprises a detecting portion for detecting the displacement of the position of the strip during transportation of the flexible strip, a control portion for selecting either a plus or minus of the detected signal upon receipt, and a strip extending portion for stopping the transportation of a predetermined section of the strip after forming a loop of the flexible strip at the entering side of the portion displaced at the position by the order of the control portion, and for extending one side of the end of the stopped portion of the flexible strip, thereby correcting the zigzag movement of the flexible strip at the zigzag moving portion while transporting the flexible strip at the portion displaced at the position.

BRIEF DESCRIPTION OF THE DRAWINGS

Other objects, features and advantages of this invention will become apparent from the following description taken in conjunction with the accompanying drawings, in which.

DESCRIPTION OF THE PREFERRED EMBODIMENT

Figure 1:
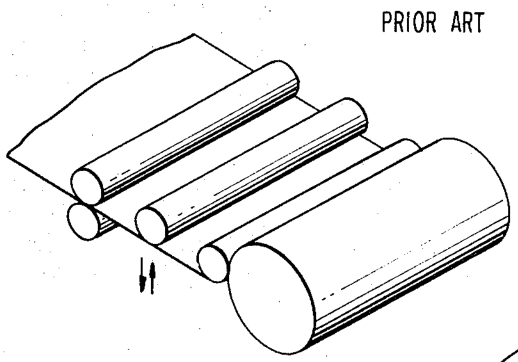
FIG. 1 PRIOR ART
FIGS. 1 to 3 show perspective views of conventional methods of correcting the zigzag movement of a strip.
Figure 2:
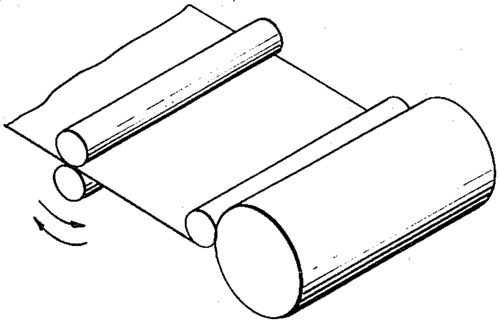
FIG. 2 PRIOR ART
Figure 3:
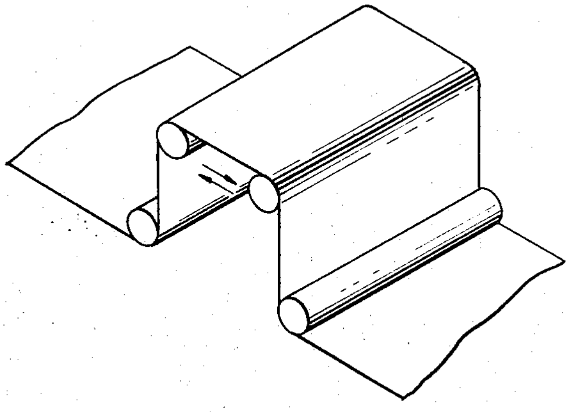
FIG. 3 PRIOR ART

Reference is now made to the drawings, particularly to FIGS. 4 to 8, which show one embodiment of the method and apparatus of this invention. A flexible strip 3 such as, for example, a dye transfer paper is advanced in the direction designated by the arrow A in FIG. 4 by a drive roller 1 and a pressure roller 2, and thereafter enters into a rotary dye transfer device (not shown). A reflection type photoelectric tube 4 is provided at the upper portion of one side of the flexible strip 3 wound on the drive roller 1. Assume that the flexible strip 3 such as, for example, a dye transfer paper, starts to move in the direction as designated by the arrow B in FIG. 7, which direction will be hereinafter called "positive zigzag movement," so that the light projected from the photoelectric tube 4 is removed from the end of the flexible strip 3 by the movement of the strip 3. As a result, the reflected light of the projected light is abruptly reduced, and a signal is fed from the photoelectric tube into the electric control portion of the control device 22 (FIG. 5) so that the drive motor 5 in the device 22 is caused to rotate.

The drive motor 5 rotates through drive gears 6 and 6' fixed to the drive motor 5 and to a rotary shaft 7, respectively. Cam **8*b* of any suitable shape, fixed to the rotary shaft 7, actuates the microswitch 9*b* disposed in the same row as that of the cam 8*b* so as to operate the electromagnetic solenoid valves mounted to cylinders 10*b*, 10*c* and 10*d*. Thus, the compressed air introduced from a compressor (not shown) actuates the piston 10*p* of the cylinder 10*b* so as to depress a roller 16 through connecting rods 11 and 11' connected to the piston 10*p*, connecting pin 12, connecting arm 13, connecting stationary pin 14, and loop forming arm 15 which rotates around the connecting stationary shaft 14, to the broken line position 23, shown in FIG. 4. As a result, a loop is formed in the moving flexible strip 3. The air cylinder 10*b* cuts off the microswitch 9*b* owing to the difference of the displacement of the cam 8*b*, and the roller 16 returns to the original position as designated by a solid line in FIG. 4 by the action of an electromagnetic solenoid valve assembled in the air cylinder 10*b*. In other words, the dye transfer paper 3 on the supply side of the roller 18*d* tentatively stops while the strip 3 is extending as will be hereinafter described, but while the dye transfer paper 3 is stopping, tension on the flexible strip 3, owing to the continuous drive of the drive roller 1 and pressure roller 2**, is prevented by the loop forming mechanism.

Then, cam **8*c* of any suitable shape actuates microswitch 9*c* opposite thereto a small period of time after the start of the operation of the cam 8*b*, and air cylinder 10*c* moves downwardly similar to the air cylinder 10*b* so as to depress the dye transfer paper 3 between a keep plate 17*c* fixed to the air cylinder 10*c* and a stationary roller 18*c*. Similarly cam 8*d* of any suitable shape actuates microswitch 9*d* a short time period after the actuation of cam 8*c* so as to move the air cylinder 10*d* downwardly to depress the flexible strip 3 between a keep plate 17*d* fixed to the air cylinder 10*d* and a stationary roller 18*d*. Cam 8*e* of any suitable shape actuates microswitch 9*e* immediately after the movement of the piston stroke of the air cylinder 10*d* is stopped, so as to move the air cylinder 10*e* downwardly. Thus, a push rod 21*a* depresses the portion of the flexible strip 3 tensioned by depression of the keep plate 17*c* and stationary roller 18*c*, and keep plate 17*d* and stationary roller 18*d* through the connecting pin 20 connected to the air cylinder 10*e* around the stationary pin 19 shown in FIG. 6 as a rotary center more than the other end of the strip 3**.

Thus, the flexible strip 3 receives one side elongation proportional to the distance from one side to the other side of the strip. Therefore, the center line of the flexible strip 3 is slightly bent into an L shape by the one side elongation so as to advance toward the rotary dye transfer device. As a result, there is gradual movement opposite to the moving direction of the strip 3 initially detected by the photoelectric tube 4. Thus, the positive zigzag movement of the strip 3 is corrected.

The drive motor 5 continues to rotate by the signal of the photoelectric tube 4, but the microswitch **9*e* is released according to the deflection angle of the cam 8*e* before the rotary shaft 7 rotates through one revolution, so that the electromagnetic clutch valve assembled in the air cylinder 10*e* operates while the air cylinder 10*e* stops and the push rod 21*a* is released to return to the original position. The deflection angle may be adjustable so as to meet the combination of the flexible strip and rotary dye transfer device. Similarly, the air cylinders 10*c* and 10*d* and keep plates 17*c* and 17*d* are, in turn, released by the cams 8*c* and 8*d***, respectively, to return to the original position.

Figure 7:
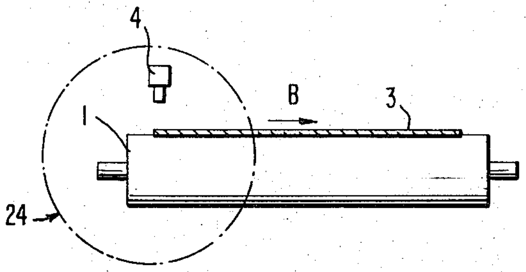
FIG. 7 is a view of the zigzag movement detecting state of the long roll of paper.
Figure 8:
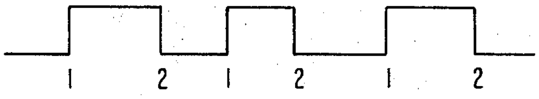
FIG. 8 is a view of the selection of the electric control portion of the apparatus of this invention.

In FIG. 7, the flexible strip 3 extended at one side advances while moving opposite to the direction as designated by the arrow B (negative zigzag movement) for a predetermined period. Thus, if the end of the flexible strip 3 again enters in the range of light beam from the light source in the photoelectric tube 4, the photoelectric tube 4 again receives the reflected light from the strip 3 so as to actuate the drive motor 5 in a manner similar to that described above the actuate the loop forming mechanism consisting of loop forming arm 15, etc., so that the push rod **17*c* and stationary shaft 18*c*, and push rod 17*d* and stationary 18*d* engage the dye transfer paper 3. Thereafter, the push rod 21*b* extends the opposite end of the strip 3 in a positive direction more than the other end of the strip by the movement of the cam 8*f*, microswitch 9*f*, and electromagnetic clutch assembled in the air cylinder 10*f*, by the selection of positive or negative of the control portion 22 instead of the push rod 21*a* of the aforesaid positive direction. As a result, the dye transfer paper 3'** starts to move again in the direction as designated by the arrow B shown in FIG. 7.

Figure 5:
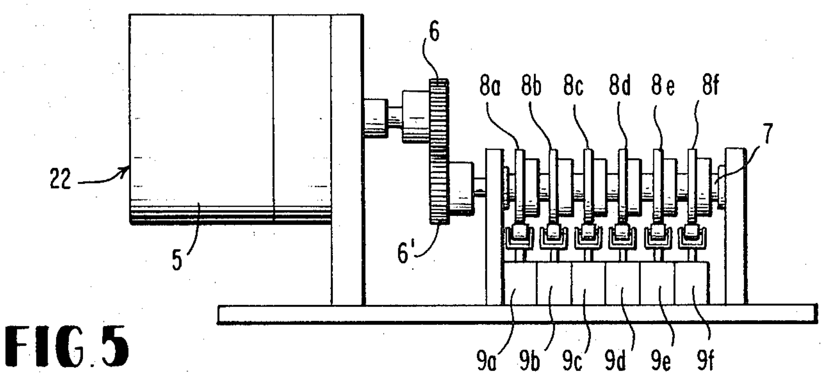
FIG. 5 is an elevational view of the rows of the cams of the control device of the apparatus shown in FIG. 4.
Figure 6:
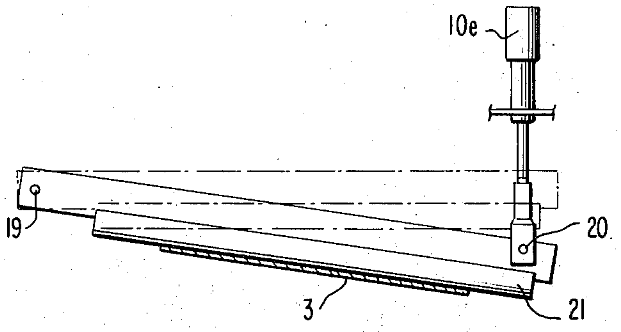
FIG. 6 is a view of the extended state of a long roll of paper.

Thus, the three steps of (1) detecting the flexible strip at the end of the strip by the detecting portion 24 (2) selecting by the control device 22 (FIG. 5), and extending the flexible strip by the extending device 23, are repeated so as to correct the zigzag movement of the dye transfer paper 3. The selection of positive or negative movement is effected by the control device 22 (FIG. 5).

Figure 4:
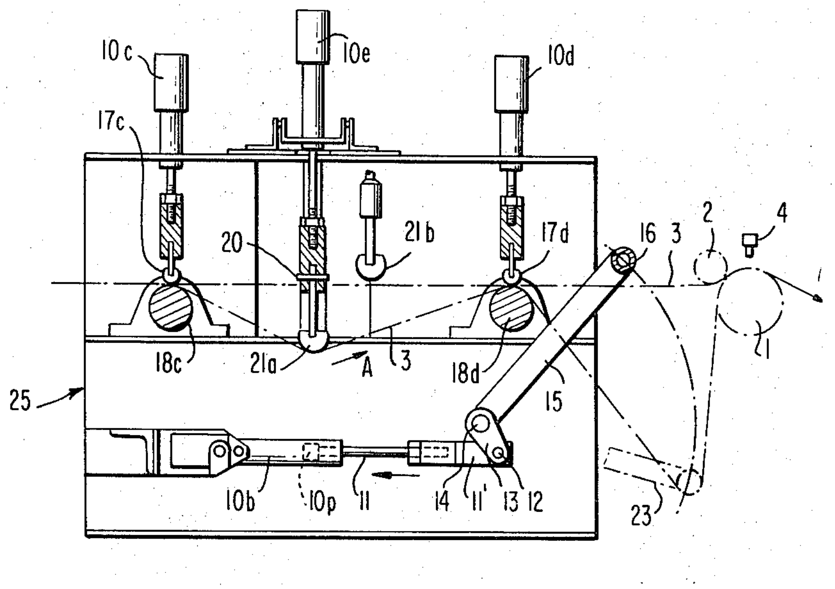
FIG. 4 is a side elevational view of one embodiment of the apparatus for correcting the zigzag movement of a flexible strip in accordance with the method of the present invention.

The characteristic feature of this invention is such that the movement of the flexible strip extending rollers **21*a* and 21*b*** in FIG. 4 is conducted on the plane of the flexible strip in comparison with the conventional method and apparatus for correcting the zigzag movement of a flexible strip. The method and apparatus of the present invention need not be limited to a rotary dye transfer device.

It should be understood from the foregoing description that since the invention automatically and accurately corrects the zigzag movement of the dye transfer paper for a multi-color rotary dye transfer device so as to completely prevent any displacement of the position in multi-color dye transfer, it serves to improve the operating efficiency and to enhance the quality of the ultimate product.

What is claimed is:

1. A method of correcting the zigzag movement of a flexible strip as it is transported in a longitudinal direction, comprising the steps of forming a loop in the flexible strip forward of the zigzag moving portion of the strip when the zigzag movement of the strip takes place while the strip is being transported, temporarily stopping the transportation of the flexible strip before entering the loop, extending one side of the strip in the zigzag direction, and thereafter feeding the zigzag portion of the flexible strip so as to correct the zigzag movement of the strip at the zigzag moving portion while transporting the zigzag moving portion of the strip longitudinally.

2. An apparatus for correcting the zigzag movement of a flexible strip as it is being transported in a longitudinal direction, comprising means for detecting the displacement of the lateral position of the strip during transportation of the strip, control means for selecting either plus or minus value of the detected signal upon receipt, and strip extending means for forming a loop in the strip and for stopping the transportation of a predetermined section of the strip rearward of the loop in response to the signal from said control means, said extending means also extending one side of the stopped portion of the flexible strip to correct the zigzag movement of the flexible strip at the zigzag moving portion while transporting the flexible strip longitudinally at the portion displaced laterally.

3. The apparatus of claim 2, wherein said extending means comprises a roller engageable with a surface of the strip at the stopped section thereof, said roller being movable to extend one side portion of the strip to effect correction of the zigzag movement when the strip is transported longitudinally.

4. The apparatus of claim wherein the longitudinal axis of said roller is movable in a plane transverse to the plane of said strip.

References Cited

UNITED STATES PATENTS 3,526,350 9/1970 Tradewell et al. ______ 226—18

ALLEN N. KNOWLES, Primary Examiner

U.S. Cl. X.R.

226—15